United States Patent [19]
Frederick et al.

[11] Patent Number: 5,751,425
[45] Date of Patent: May 12, 1998

[54] APPARATUS AND METHOD FOR DETECTING ROTATION RATE, FARADAY BIAS AND CAVITY LENGTH IN A RING LASER GYROSCOPE

[75] Inventors: Donald A. Frederick, Woodland Hills; John G. Mark, Pasadena; Daniel A. Tazartes, West Hills; David B. Hall, La Crescenta; Tae W. Hahn, Chatsworth, all of Calif.

[73] Assignee: Litton Systems, Inc., Woodland Hills, Calif.

[21] Appl. No.: 777,498

[22] Filed: Dec. 30, 1996

[51] Int. Cl.⁶ .................................................. G01C 19/64
[52] U.S. Cl. .................................................. 356/350
[58] Field of Search ..................................... 356/350

[56] References Cited

U.S. PATENT DOCUMENTS 3,892,486  7/1975  Ferrar .
4,652,132  3/1987  Nelson ................................... 356/350
5,116,132  5/1992  Mitchell ................................. 356/350

Primary Examiner—Vincent P. McGraw
Attorney, Agent, or Firm—Lynn & Lynn

[57] ABSTRACT

A ring laser gyroscope having an alternating Faraday bias includes mode combining apparatus arranged to cause interference between the modes that propagate within the cavity. Signal separating apparatus separates a signal indicative of rotation of the frame from other components of the combined intensity signal. The signal separating apparatus produces two signals indicative of the light intensity in the interference pattern of the combined modes. These two signals have a 180° phase difference in corresponding components that are dependent upon the geometric bias caused by the non-planar optical path to produce a rotation signal that is independent of the spatially uniform interference fringes caused by the geometric bias.

30 Claims, 5 Drawing Sheets

APPARATUS AND METHOD FOR DETECTING ROTATION RATE, FARADAY BIAS AND CAVITY LENGTH IN A RING LASER GYROSCOPE

BACKGROUND OF THE INVENTION

This invention relates generally to multioscillator laser gyroscope rotation sensors and particularly to apparatus and methods for obtaining electrical signals that may be processed to determine the rotation rate and optical path length of the laser. Still more particularly, this invention relates to apparatus and methods for determining rotation rate, optical path length and magnitude of an alternating Faraday bias in a multioscillator ring laser gyroscope.

The spectrum of laser light in a multioscillator laser is well known. A non-planar laser cavity provides a geometric bias that separates right (R) and left (L) circularly polarized modes. The geometric bias is typically a few hundreds of megahertz. Each of theses two modes is also divided into two counterpropagating clockwise (C) and anti-clockwise (A) modes by a magnetooptic element that provides a Faraday bias that typically ranges from hundreds of kilohertz to a few megahertz.

The counterpropagating modes of the same circular polarization pairs will have roughly the same frequency separation due to the frequency bias. The frequency separation of the two pairs of modes will be affected oppositely by the Sagnac frequency shift. The difference between these two frequency separations gives a measure of the Sagnac frequency shift due to rotation about the sensing axis. Alternately, the two pairs of counterpropagating modes of opposite circular polarization, i.e., the pair $R_A$ and $L_C$, and the pair $R_C$ and $R_A$, may be used to determine the rotation rate. These two pairs of modes will have the same frequency separations due to the geometric bias, but oppositely signed separations due to rotation rate. The difference between these two frequency separations also gives a measure of rotation rate.

The laser cavity length must be controlled in order to stabilize the difference of frequency separations. Therefore, a measure of cavity length must also be obtained to minimize differences in the frequency separations that are not due to rotation.

Heretofore, the interference between the pair of modes $R_A$ and $R_C$ and of the pair of modes $L_A$ and $L_C$ have been used to detect rotation rate and cavity length. Since the two sets of interference fringes are composed of two different circular polarizations, one might use polarizers to distinguish between them. However, preferred structures for multioscillator laser gyroscopes use mirrors that transmit nearly linearly polarized light, and, therefore, the circular polarizations that exit the ring laser cavity are indistinguishable. One must discriminate between the two fringe patterns based on their intensities.

Detection of the appropriate frequency separations is accomplished with a prism that combines counterpropagating beams to produce an interference pattern. By adjusting the position of the prism, the width of the fringes produced by interfering counterpropagating beams can be controlled. The intensity of the fringes produced by interfering copropagating modes, e.g., two clockwise beams, remains spatially uniform across the exiting laser beam. At any point on the laser output, the frequency of the intensity variation due to a set of interference fringes is equal to the frequency separation of the two modes that are interfering to produce the fringes.

Present multioscillator ring laser gyroscopes have difficulties with bias stability and temperature sensitivity. Many categories of multioscillator bias misbehavior, while not completely understood theoretically, have been found empirically to be proportional to the Faraday bias of the instrument. These include bias offset, bias trend or wander, and the linear and sinusoidal temperature sensitivities of the bias.

One embodiment of this intensity detection scheme has used the Faraday bias frequency as a carrier. Spatially separated photodetectors are used to detect the frequency and the spatially varying phase of the Faraday bias modulation by the rotation rate. Alternate embodiments have also used spatially separated detectors with time delays added to their signals before combining them to isolate the different fringe patterns. These delays must be specific fractions of the periods of the signals from the left circular polarized beams and from the right circularly polarized beams interference.

In multioscillator laser gyros having an alternating Faraday bias, these schemes are severely limited. The Faraday bias is generated by an electromagnet carrying electric current through coils wound around a portion of the cavity in the vicinity of the magnetooptic element. The magnetic fields produced by these coils are generally less than the fields available from permanent magnets employed in the standard multioscillator designs. This makes the Faraday bias ineffective as a carrier frequency. The modulation produced by the rotation rate can be of a comparable or even greater frequency than the frequency of the Faraday bias. Time delays of a given fraction of the interference period of one polarization are also difficult to maintain because this period can change by a significant fraction as a result of only modest rotation rates.

SUMMARY OF THE INVENTION

This invention provides an apparatus and method for processing signals output from a multioscillator ring laser gyroscope to determine the rotation rate, provide cavity length control and monitor the Faraday bias on modes that propagate in the laser cavity. The apparatus and method of the present invention are particular useful with a multioscillator ring laser gyroscope having an alternating Faraday bias. Applying an AC bias to a multioscillator ring laser gyroscope and obtaining a useful output from it involves major changes in known multioscillator instruments. The AC biased multioscillator ring laser gyroscope is being developed to solve certain problems with present multioscillator ring laser gyroscopes. These problems include bias stability and temperature sensitivity.

Accordingly, a multioscillator ring laser gyroscope according to the present invention includes a frame having a cavity therein and a sensing axis about which rotations may be measured using the Sagnac effect. The cavity guides right circularly polarized clockwise and anticlockwise modes and left circularly polarized clockwise and anticlockwise modes in a closed non-planar optical path that causes a geometrical bias between counterpropagating modes. A Faraday rotator is placed in the optical path to provide a Faraday bias for splitting the frequencies of the right circularly polarized clockwise and anticlockwise beams and the left circularly polarized clockwise and anticlockwise beams to provide a four different mode frequencies in the cavity. A mode combining apparatus is arranged to cause interference between the modes that propagate within the cavity. The mode combining apparatus may comprise a prism and a beam splitter. The mode combining apparatus produces a combined intensity signal that is indicative of the light intensity in the interference pattern. Signal separating apparatus is arranged to separate a signal indicative of rotation of the frame from other components of the combined intensity signal. Signal processing apparatus then processes the signal indicative of rotation of the frame to measure rotation of the multioscillator ring laser gyroscope about the sensing axis.

The signal separating apparatus may comprise apparatus for producing a second combined intensity signal, the two combined intensity signals having a 180° phase difference in corresponding components that are dependent upon the geometric bias. The signal separating apparatus may further include apparatus for processing the two combined intensity signals to produce the signal indicative of rotation of the frame, which is independent of the spatially uniform interference fringes caused by the geometric bias.

The signal separating apparatus may comprises apparatus for producing an intensity sum signal that is indicative of the sum of the uncombined separate beam intensities in the cavity and a delay apparatus arranged to receive the intensity sum signal and produce a delayed intensity sum output signal. A first signal summing apparatus is arranged to receive the delayed intensity sum output signal and the first combined intensity signal. A first demodulator apparatus is connected to the first signal summing apparatus and formed to produce an output signal proportional to sin (2St) where S is the rotation rate of the frame about the sensing axis due to the Sagnac effect and t is the time. A second signal summing apparatus is arranged to receive the delayed intensity sum output signal and the second combined intensity signal, and a second demodulator apparatus connected to the second signal summing apparatus and formed to produce an output signal proportional to cos (2St) where S is the rotation rate of the frame about the sensing axis due to the Sagnac effect and t is the time.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Structure of the Apparatus of the Invention

Figure 1:
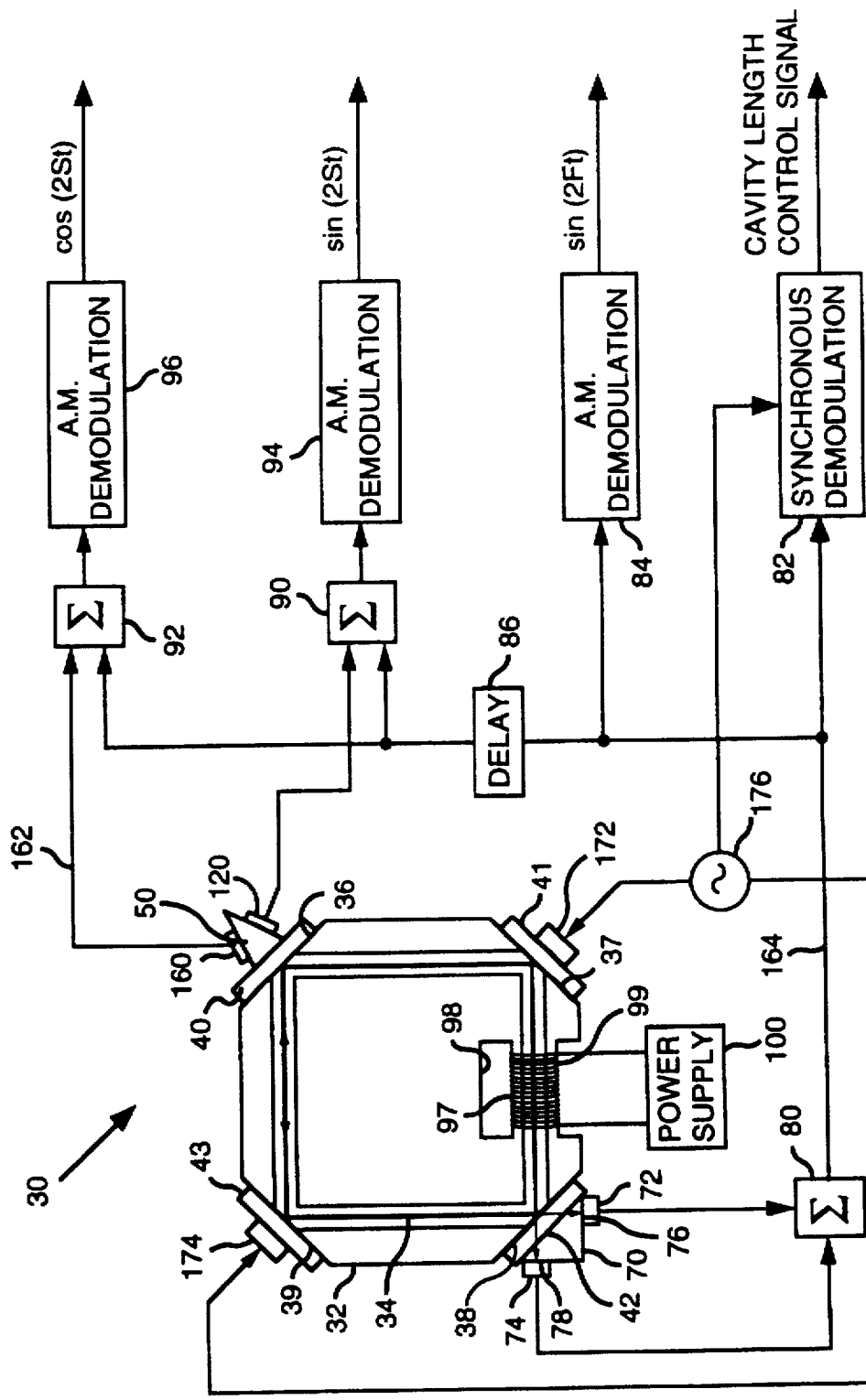
FIG. 1 is a plan view that illustrates a multioscillator ring laser gyroscope and signal processing apparatus according to the present invention.
Figure 2:
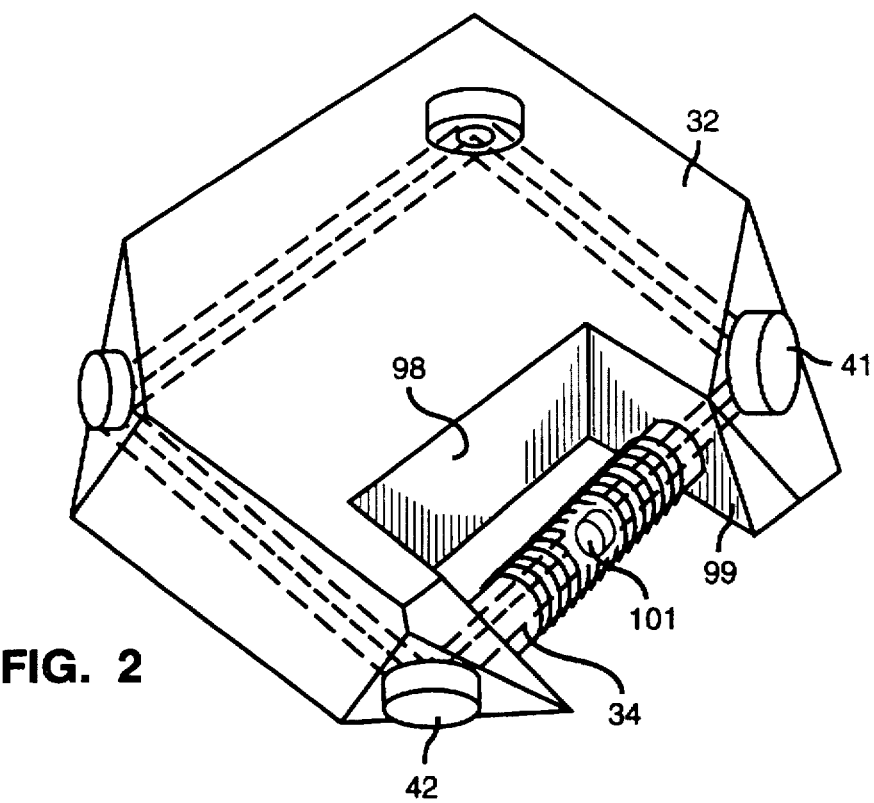
FIG. 2 is a perspective view of the multioscillator ring laser gyroscope of FIG. 1.
Figure 3:
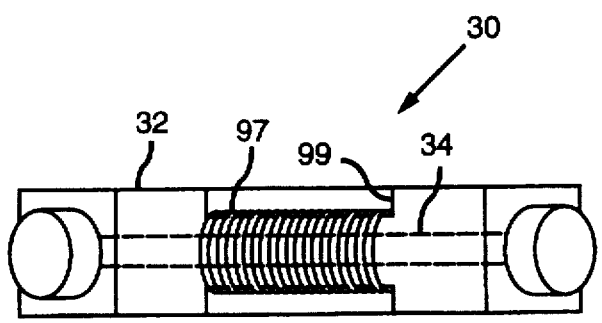
FIG. 3 is a front elevation view of the apparatus of FIGS. 2 and 3.

Referring to FIGS. 1–3, a multioscillator ring laser gyroscope 30 includes a frame 32 formed to have an out of plane cavity 34 formed therein in the usual manner for such devices. The frame 32 is preferably formed of a glass-ceramic composite material that has a very low thermal expansion coefficient as is customarily used in forming ring laser gyroscopes. The cavity 34 is filled with a gain medium, which is typically a mixture of helium and neon. Electrodes (not shown) are used to apply electrical energy to the gain medium. The gain medium then undergoes the energy level transitions required to produce the lasing action as is well-known in the art. If the total optical path length around the cavity is correctly chosen in relation to a selected wavelength of the light emitted from the gain medium, then the selected wavelength is amplified in the cavity 34.

Figure 5:
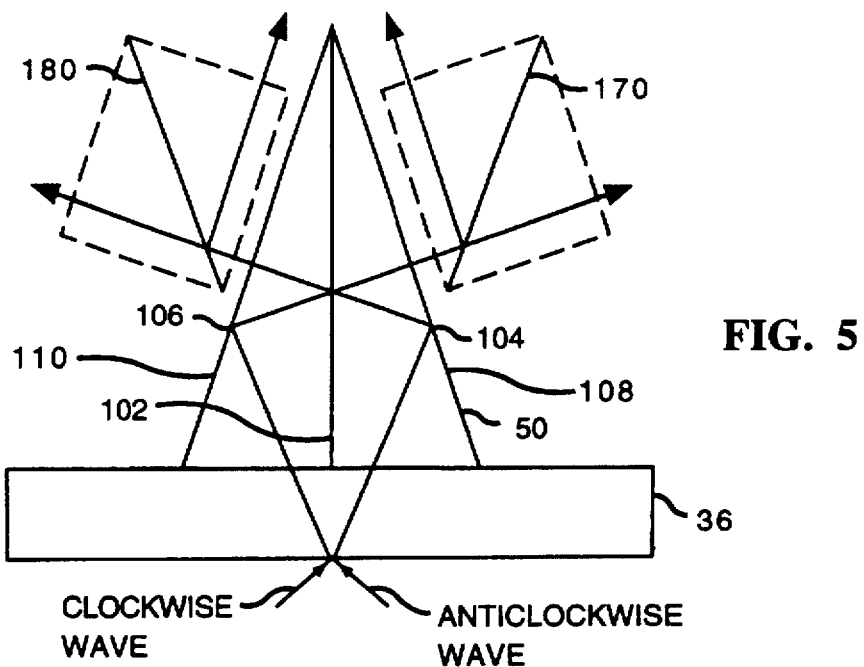
FIG. 5 shows a combining prism that produces either two or four outputs that are combinations of the counterpropagating modes in a multioscillator ring laser gyroscope.

The cavity 34 preferably has four corners 36–39. Mirrors 40–43 are mounted to the frame 32 at the corners 36–39, respectively, to reflect the light so that it traverses the selected optical path. The mirror 36 is partially transmissive so that portions of the beams guided in the cavity 34 pass through the mirror 36 out of the cavity 32. A combining prism 50, shown in greater detail in FIG. 5, is mounted on the outside face of the mirror 36.

The mirror 38 is also partially transmissive so that portions of the beams guided in the cavity pass through the mirror 38 out of the cavity 32. A prism 70 is mounted to the outer face of the mirror 38. A pair of detectors 72 and 74 are mounted to faces 76 and 78 of the prism 70. The portions of the counterpropagating modes that exit the cavity 34 at the mirror 38 do not change direction in the prism 70. Instead, the clockwise mode is directed to the detector 74, which produces an electrical signal indicative of the intensity of the modes propagating clockwise in the cavity 34. Similarly, the anticlockwise mode is directed to the detector 72, that produces an electrical signal indicative of the intensity of the modes propagating anticlockwise in the cavity 34.

The electrical signals output from the detectors 72 and 74 are input to an analog summing circuit 80, that produces an output intensity sum signal. The intensity sum signal is input to a synchronous demodulator 82, a first amplitude demodulator 84 and a delay circuit 86. The intensity sum signal passes through the delay circuit 86 and is then input to a summing circuit 90 and to a summing circuit 92. The output of the summing circuit 90 is input to an amplitude demodulator 94, and the output of the summing circuit 92 is input to an amplitude demodulator 96.

As shown in FIGS. 1 and 3, a wire coil 97 may be formed around a portion of the cavity 34. A passage 98 is formed in the frame 32 adjacent a leg of the cavity 34. A recess 99 is formed at an edge of the frame. The passage 98 and recess 99 allow the wire coil to be formed near the cavity 34. An electrical power source 100 is connected across the coil to create an axially directed magnetic field in the region of the cavity 34 that is inside the wire coil.

Referring to FIG. 2, a Faraday rotator element 101 is placed inside the cavity 34. The Faraday rotator element 101 preferably is located at the center of the coil 97. The Faraday rotator element 101 is placed in the cavity 34 before the mirrors 41 and 42 are attached to the frame 32. The axial magnetic field acts on the Faraday rotator element 101, that interacts with the counterpropagating modes to provide phase shifts by means of the Faraday effect. The coil 97 should be as close to the Faraday rotator element 101 and as close to the laser beam as possible.

Figure 4:
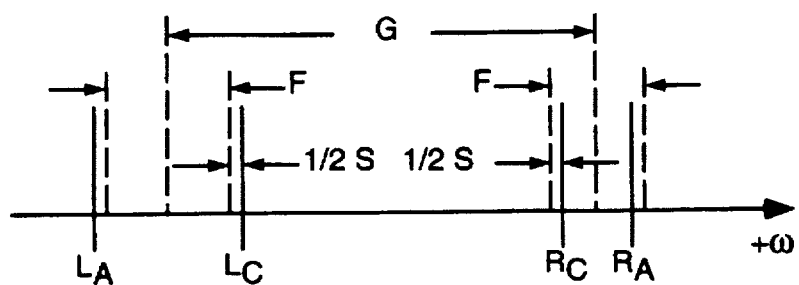
FIG. 4 shows the spectrum of a multioscillator ring laser gyroscope, showing the geometric bias, G, the Faraday bias, F, and a Sagnac frequency shift, S, due to rotation.

FIG. 4 illustrates a typical spectrum of the optical frequencies that propagate in the cavity. The multioscillator ring laser gyroscope 30 has two circularly polarized modes propagating in both the clockwise and anticlockwise directions in the cavity 34. The modes are indicated as follows:

$L_A$ is the left circularly polarized anticlockwise mode;

$L_C$ is the left circularly polarized clockwise mode;

$R_A$ is the left circularly polarized anticlockwise mode; and $R_C$ is the left circularly polarized clockwise mode.

The Faraday element 101 shifts the frequencies of the modes in the cavity. The amount of frequency shift depends upon the direction of the applied magnetic field on the coil 97 relative to the polarization, the magnitude of the magnetic field and the Verdet constant of the Faraday element. The frequency difference due to the geometric bias of the cavity between the left and right circularly polarized modes is indicated in FIG. 4 as G. The frequency difference between the left circularly polarized clockwise and anticlockwise modes due to the Faraday bias is indicated in FIG. 4 as F. If the frame 32 is rotating about its sensing axis, the Sagnac effect shifts the modes $L_A$ and $L_C$ by a frequency S. In general each of the modes $L_A$ and $L_C$ are shifted from their frequencies determined by the sum of the geometric and Faraday biases by half of the Sagnac frequency. FIG. 4 shows the mode $L_C$ shifted up in frequency toward the center of the spectrum while the mode $R_C$ is shifted down in frequency toward the center of the spectrum.

Referring to FIG. 5, the combining prism 50 includes a beam splitter 102. The combining prism 50 and beamsplitter 102 cooperate to combine the counterpropagating modes and produce a pair of interference patterns at location 104 and 106 on faces 108 and 110, respectively, of the combining prism 50. Photodetectors 120 and 160 (FIG. 1) are attached to the faces 108 and 110, respectively. The photodetectors 120 and 160 produce electrical signals that are indicative of the light intensities in the interference patterns.

Still referring to FIGS. 1 and 5, the signals exiting the multioscillator ring laser gyroscope 30 at the photodiodes 72 and 74 are added at the summer 80. The summer 92 adds the output of the summer 80 to the combined beam signal from the photodiode 160 to produce an electrical signal proportional to cos (Gt) cos (St). Signals output from the multioscillator ring laser gyroscope 30 to the photodiodes 72, 74 and 120 are added at the summer 90 to produce an electrical signal proportional to cos (Gt) sin (St). The signals output from the summers 90 and 92 are demodulated by the demodulators 94 and 96, respectively. The geometric bias frequency G is the carrier frequency. The demodulation produces the sine and cosine of the rotation fringe phase caused by the Sagnac effect.

Referring to FIGS. 1, a piezoelectric actuator 172 may be connected to the mirror 41. Another piezoelectric actuator 174 may be connected to the mirror 43. The piezoelectric actuators 172 and 174 are driven with an oscillator 176 at a frequency ω. The piezoelectric actuators then vibrate at the frequency ω, which introduces an amplitude modulation of the modes propagating in the cavity 34. The piezoelectric actuators 172 and 174 are used to apply dither signals to the counterpropagating modes for cavity length control. The oscillator 176 is connected to the demodulator 82, which provides the component of laser intensity modulation that is synchronous with the cavity length dither. Cavity length control is provided by maintaining this signal at a constant magnitude. Cavity length is typically adjusted by moving one or more of the mirrors in a manner well-known in the ring laser gyroscope art.

FIGS. 6–11 illustrate various arrangements of optical fibers and photodiodes that may be used to obtain signals for subsequent processing to determine the rotation rate and provide cavity length control.

Figure 6:
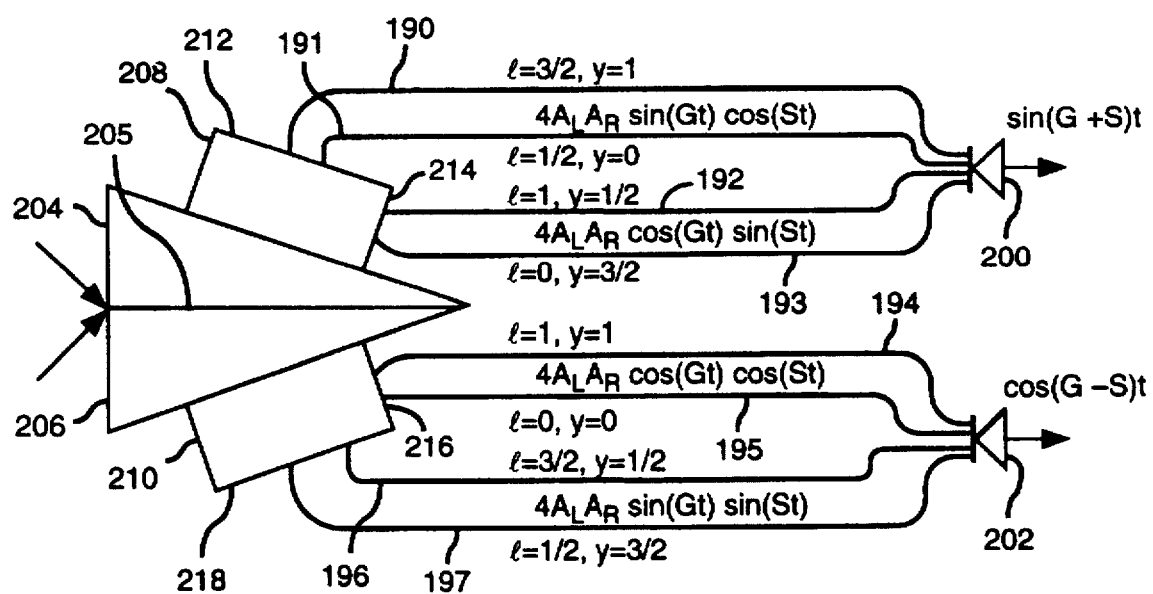
FIG. 6 schematically illustrates fiber optic waveguides being used to guide optical signals output from the multioscillator ring laser gyroscope of FIG. 1 to photodiodes.

FIG. 6 shows a plurality of fiber optic waveguides 190–197 being used to guide the optical signals output from the multioscillator ring laser gyroscope 30 to a pair of photodetectors 200 and 202. The lengths, l of the fiber optic waveguides 190–197 are given in FIG. 6 in units of cπ/G, where c is the speed of light and G is the geometric bias. The displacements, y, of the fiber optic waveguides 190–197 are given in FIG. 6 in units of π/k from the center of the interference patter, where k is the wavenumber of the laser light times the sine of the angle between the counterpropagating beams made to interfere by the prism and beamsplitter.

FIG. 6 illustrates a combining prism 204 that may be similar to the combining prism 50 described above. It is to be understood that the clockwise and anticlockwise beams in the multioscillator ring laser gyroscope 30 are incident upon the base 206 of the combining prism 204. A pair of beam splitters 208 and 210 receive the combined modes from the combining prism 204.

The fiber optic waveguide 190 is arranged to receive the combined beams output from a first location on a surface 212 of the beam splitter 208. The fiber optic waveguide 190 has a length indicated by l=½. The length of the fiber optic waveguide 190 determines the delay time for a light mode to propagate the length of the fiber optic waveguide 190 to the photodetector 200. The fiber optic waveguide 190 has a displacement ky/π=1.

The fiber optic waveguide 191 is also arranged to receive light output from the beamsplitter 208 at the surface 212. The fiber optic waveguide 191 also guides light to the detector 200 and has a delay length of l=½ and a displacement ky/π=0. The sum of the intensities of the modes guided by the fiber optic waveguides 190 and 191 is given by $4A_L A_R$ sin (Gt) cos (St).

The fiber optic waveguides 192 and 193 are arranged to receive light output from a surface 214 of the beamsplitter 208 and to deliver the light to the photodetector 200. The fiber optic waveguide 192 has l=1 and ky/π=½. The fiber optic waveguide 193 has l=0 and ky/π=½. The sum of the intensities of the modes guided by the fiber optic waveguides 192 and 193 is given by $4A_L A_R$ cos (Gt) sin (St). The sum of the light signals that the fiber optic waveguides 190–193 deliver to the photodetector 200 is given by sin(G+S)t.

The fiber optic waveguides 194 and 195 are arranged to receive light output from a surface 216 of the beamsplitter 210. The fiber optic waveguide 194 has a delay length of l=1 and a displacement of ky/π=1 from the beam center. The fiber optic waveguide 195 has a delay length of l=0 and a displacement of ky/π=0 from the beam center. The sum of the intensities of the modes guided by the fiber optic waveguides 194 and 195 is given by $4A_L A_R$ cos (Gt) cos (St).

The fiber optic waveguides 196 and 197 are arranged to receive light output from a surface 218 of the beamsplitter 210. The fiber optic waveguide 196 has a delay length of l=½ and a displacement of ky/π=½ from the beam center. The fiber optic waveguide 197 has a delay length of l=½ and a displacement of ky/π=3/2 from the beam center. The sum of the intensities of the modes guided by the fiber optic waveguides 196 and 197 is given by $4A_L A_R \sin(Gt) \sin(St)$. The sum of the light signals that the fiber optic waveguides 194–197 deliver to the photodetector 202 is given by cos( G–S)t.

Figure 7:
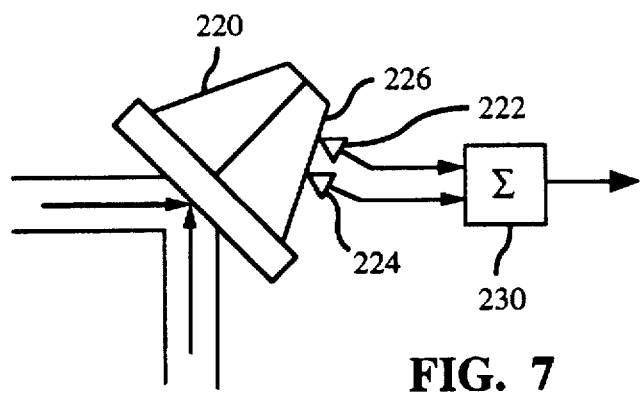
FIG. 7 illustrates placement of a pair of photodiodes on a combining prism that may used in the apparatus according to the present invention.

FIG. 7 illustrates a combining prism 220 arranged to receive the counterpropagating modes in the multioscillator ring laser gyroscope 30 and produce an interference pattern that may be processed. A pair of photodiodes 222 and 224 are mounted on a surface 226 of the combining prism 220. The photodiode 222 is located in the interference pattern at ky=0, and the photodiode 224 is at ky=π. The photodiodes 222 and 224 produce electrical signals that are input to a summing circuit 230. Because of the displacement between the photodiodes 222 and 224, the summing circuit produces a signal output that is the difference of the electrical outputs of the photodiodes 222 and 224, which is given by 4 cos (Gt) cos (St).

Figure 8:
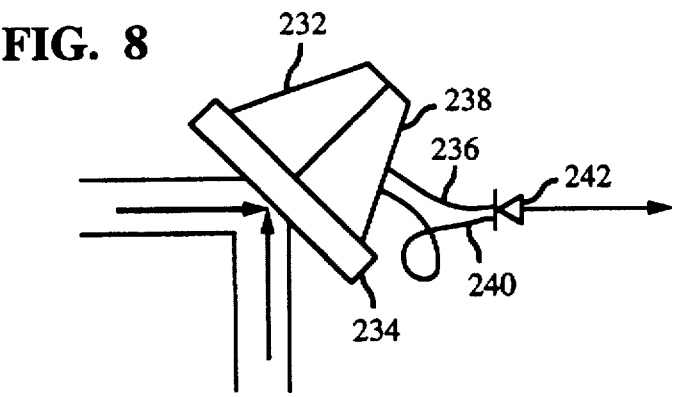
FIG. 8 illustrates an arrangement of optical fibers to guide optical signals output from a multioscillator ring laser gyroscope away from a combining prism.

FIG. 8 shows a combining prism 232 mounted to a partially transmissive mirror 234 that may be mounted to the multioscillator ring laser gyroscope frame 32. A first optical fiber 236 has a first end mounted to a surface 238 of the combining prism 232 at ky=0. A second optical fiber 240 has a first end mounted to the surface 238 at ky=π. The other ends of both optical fibers 236 and 240 direct light output from the combining prism 232 to a photodiode 242. The optical fiber 240—is longer than the optical fiber 236 by cπ/nG, where c and G have been defined above and n is the refractive index of the two optical fibers 236 and 240. The optical signals output from the two optical fibers 236 and 240 are added together at the photodiode 242, which produces an electrical signal output of 4 cos (Gt) cos (St).

Figure 9:
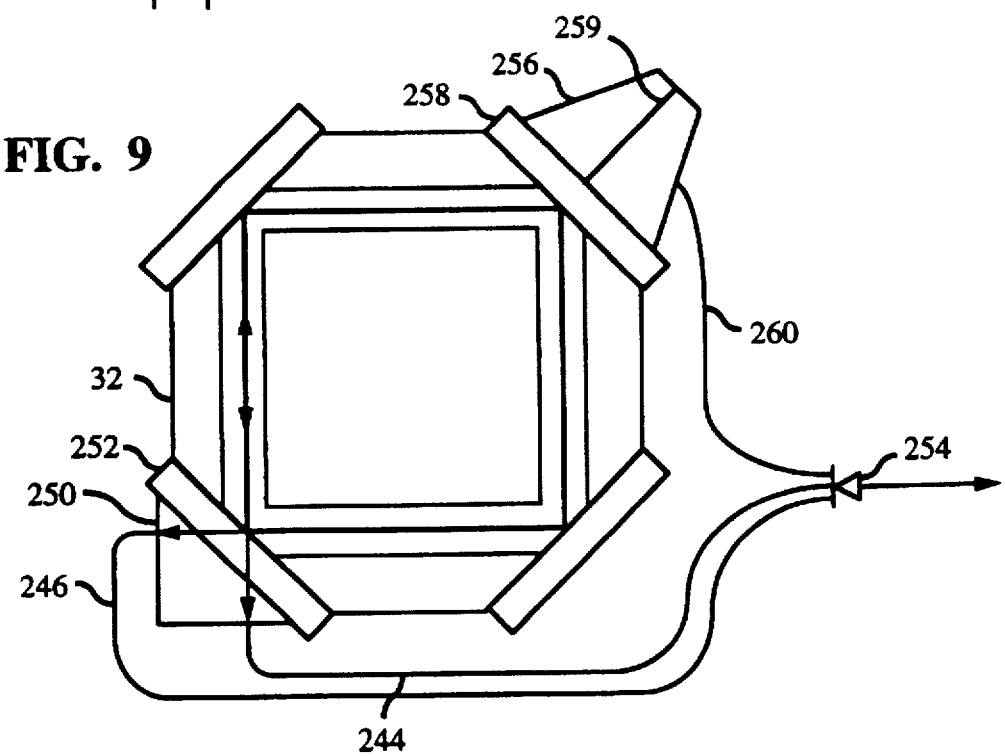
FIG. 9 illustrates an arrangement of optical fibers to guide the combined modes and the uncombined modes output from a multioscillator ring laser gyroscope to a photodiode.

Referring to FIG. 9, a pair of optical fibers 244 and 246 are mounted to a prism 250. The prism 250 is mounted to a partially transmissive mirror 252 that is mounted to the frame 32. The prism 250 directs the portion of uncombined beams transmitted through the mirror 252 to the optical fibers 244 and 246. As shown, the clockwise beam impinges upon an end of the optical fiber 246 while the anticlockwise beam impinges upon an end of the optical fiber 244. The optical fibers 244 and 246 direct the uncombined beam signals to a photodiode 254. The optical path lengths of the optical fibers 244 and 246 are equal.

Still referring to FIG. 9, a combining prism 256 is mounted to a partially transmissive mirror 258 that is mounted to the frame 32. An optical fiber 260 is arranged with respect to the combining prism 256 to receive an optical signal that contains the interference pattern between the counterpropagating modes in the cavity 34. The optical fiber 260 directs the optical signal input thereto to the photodiode 254. The electrical signal output from the photodiode 254 is the sum of the uncombined beam intensity plus the combined beam intensity and is equal to 4 cos (Gt) cos (St).

Figure 10:
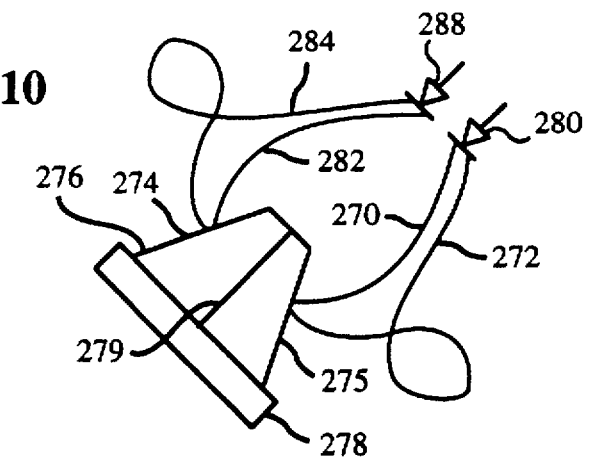
FIG. 10 illustrates an arrangement of four optical fibers for guiding the combined beams from a combining prism to a pair of photodiodes.

FIG. 10 illustrates a pair of optical fibers 270 and 272 mounted to a surface 274 of a combining prism 276. The combining prism 276 is mounted to a partially transmissive mirror 278 that receives the counterpropagating modes in the cavity 34. The optical fiber 270 has its input end at ky=π/2 in the interference pattern while the input end of the optical fiber 272 is at ky=3π/2. The output ends of the two optical fiber direct signals to a photodiode 280, which adds the optical signals input thereto and produces an electrical signal proportional to 4 cos (Gt) sin (St).

Still referring to FIG. 10, a second pair of optical fibers 282 and 284 are mounted to a surface 286 of the combining prism 276. The optical fibers 282 and 284 are located at ky=0 and ky=π, respectively, in the interference pattern as described with reference to FIG. 8. The optical fibers 282 and 284 direct optical signals to a photodiode 288, which produces an output of 4 cos (Gt) cos (St).

The optical fibers 272 and 274 may be located at ky=π/4 and ky=5π/4, respectively, to give an output at the photodiode 280 that is proportional to $$4\cos(Gt)\cos\left(St - \frac{\pi}{4}\right).$$

In this case the second harmonic of the output of the photodiode 280 is in quadrature with the signal 4 cos (Gt) cos (St) that is output from the photodiode 288.

Figure 11:
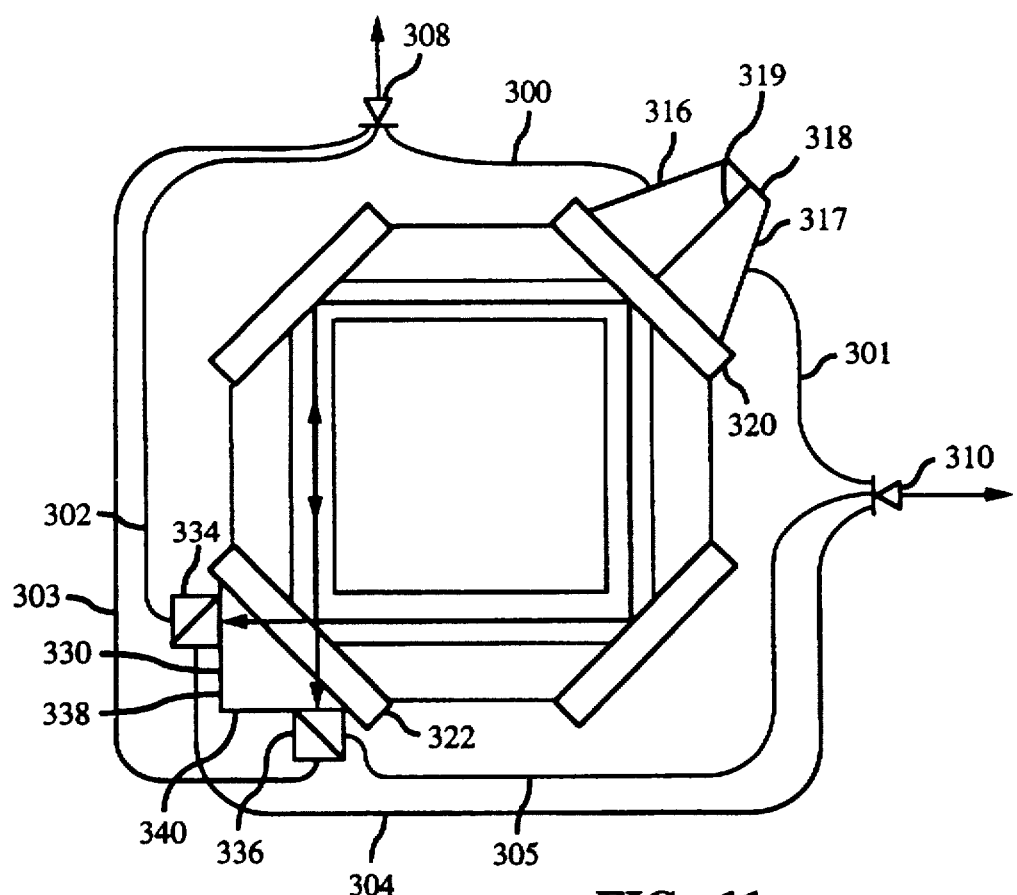
FIG. 11 illustrates a second arrangement of four optical fibers for guiding the combined beams from a combining prism to a pair of photodiodes.

Referring to FIG. 11 there is shown another arrangement of optical fibers 300–305 and photodiodes 308 and 310 that may be employed to provide output signals from the multioscillator ring laser gyroscope 30. The optical fiber 300 is mounted to a first surface 316 of a combining prism 318. The optical fiber 301 is mounted to a second surface 317 of the combining prism 318. The combining prism 318 is mounted to a partially transmissive mirror 320 that receives the counterpropagating modes in the cavity 34. The optical fiber 300 provides the combined beam signal to the photodiode 308 while the optical fiber 301 provides the combined beam signal to the photodiode 310.

Still referring to FIG. 11, a prism 330 is mounted to a partially transmissive mirror 322 that is mounted to a frame. A pair of beamsplitters 334 and 336 are mounted to surfaces 338 and 340 of the prism 330. Portions of the uncombined beams are input to the optical fibers 302–305. The optical fibers 302 and 304 receive the clockwise mode while the optical fibers 303 and 305 receive the counterclockwise mode. The optical fiber 302 and 303 direct the uncombined beam intensity signals to the photodiode 308 where they are added with the combined beam optical signal output from the optical fiber 300. The electrical output of the photodiode 308 is proportional to 4 cos (Gt) sin (St). The optical fibers 304 and 305 direct the uncombined beam intensity signals to the photodiode 310 where they are added with the combined beam optical signal output from the optical fiber 301. The electrical output of the photodiode 308 is proportional to 4 cos (Gt) cos (St).

Method of Operation of the Apparatus

The required output signals are an unambiguous signed rotation rate, a cavity length control discriminant, and a sum of the Faraday biases to use as a dither offset control. A certain amount of the processing can be done optically with incoherent transmission through multimode plastic fibers. This will eliminate some R.F. mixing and amplification, trading R.F. electronics problems for challenges in adjusting and maintaining fiber alignment.

It can be shown that the intensity I(y,t) in the interference pattern produced by the multioscillator ring laser gyroscope 32 at a detector located at a position y at time t is given by:

$$I(y,t) = 2[A_L^2 + A_R^2] + \quad (1)$$

$$A_L^2[\cos((\omega_{LC} - \omega_{LR})t + ky] + A_R^2[\cos((\omega_{RA} - \omega_{RC}))t + ky] +$$

-continued $$A_L A_R[\cos((\omega_{RC} - \omega_{LA}))t + ky) + \cos((\omega_{RA} + \omega_{LC}))t + ky)] +$$

$$A_L A_R[\cos(\omega_{RC} - \omega_{LC})t) + \cos((\omega_{RA} - \omega_{LA})t],$$

where k is the optical mode number times the sine of the angle between combined counterpropagating beams, $A_L$ and $A_R$ are the amplitudes of the left and right circularly polarized modes, respectively, and $\omega$ is the optical frequency of the mode indicated by its subscript. The geometric bias frequency G indicated in FIG. 4 may be written as:

$$G = \frac{1}{2}((\omega_{RC} + \omega_{RA}) - (\omega_{LC} + \omega_{LA})). \quad (2)$$

The Faraday bias frequency F indicated in FIG. 4 may be written as:

$$F = \frac{1}{2}((\omega_{RA} - \omega_{RC}) + (\omega_{LC} - \omega_{LA})). \quad (3)$$

The rotation-induced Sagnac frequency S indicated in FIG. 4 may be written as:

$$S = \frac{1}{2}((\omega_{RA} + \omega_{RC}). \quad (4)$$

Using the expressions from Eqs. (2), (3) and (4) in Eq. (1) gives:

$$I(Y,t) = 2[A_L^2 + A_R^2] + \quad (5)$$

$$A_L^2((F - S)t + ky + A_R^2((F + S)t - ky) +$$
$$A_L A_R[\cos((G - S)t + ky) + \cos((G + S)t - ky)] +$$

$$A_L A_R[\cos(G - F)t) + \cos((G + F)t]$$

The first line of Eq. (5) contains DC terms. The second line describes the signals near the Faraday bias frequency, which have heretofore been used to read rotation rate and cavity length. The last two lines describe signals near the geometric frequency bias frequency. The fringes described by the third line are spatially varying and have a frequency that depends on rotation rate, while those described by the fourth line are spatially uniform and contain no rotation information.

With the problems presented by the relatively low magnitude of alternating Faraday bias, it becomes desirable to use the signal near the geometric bias frequency to obtain rate information. To do this, the terms in line four of Eq. (5), which are nearly the same frequency but contain no rate information, must be eliminated. There are several embodiments for obtaining this result are described herein. Each uses a 180° phase shift of the geometric bias signal to cancel the unwanted, spatially uniform interference fringes while using the spatial variation of the desired signal to retain the rotation rate information.

Consider the first two signals originating from positions on the output with ky=0 and with ky=π. After filtering to allow only frequencies near that of the geometric bias to pass, the signals are:

$$A_L A_R[\cos((G-S)t)+\cos((G+S)t+\cos((G-F)t)+\cos((G+F)t)] \quad (6)$$

and $$A_L A_R[-\cos((G-S)t)-\cos((G+S)t)+\cos((G-F)t)+\cos((G+F)t)] \quad (7)$$

These signals can be captured on photodiodes and subtracted from one another to yield:

$$2A_L A_R[\cos((G-S)t+\cos((G+S)t)]=4A_L A_R \cos Gt \cos St. \quad (8)$$

Alternately, one of the two initial signals can be delayed by a time π/G. Referring to FIG. 1, this delay can be accomplished electrically. Referring to FIG. 8, the delay can also be accomplished by capturing the two signals in the pair of fiber optical waveguides 36 and 40 and making one guide cπ/nG longer than the other, where c/n is the speed of light in the guide. Adding the two resulting signals then produces the signal having the form shown in Eq. (8), and no high-pass filtering is needed.

Another alternative uses the signal that appears on the uncombined beams. The sum of the intensities of the exiting clockwise and anticlockwise beams at the prism 70 can be written:

$$I_C + I_A = A'_L A'_R[\cos ((G-F)t+\phi)+\cos ((G+F)t+\phi]. \quad (9)$$

Eq. (9) describes the signal output from the summing circuit 80 of FIG. 1. This sum can be observed by allowing some light to leave the combining prism before the counterpropagating beams are combined, or by observing the output of another mirror that has no combining prism attached. After adjusting the amplitudes so that $A_L A_R = A'_L A'_R$, and delaying the signal so that $\phi=\pi$(or 0), this sum can be added to (or subtracted from) one of the two original signals to obtain the signal described in Equation 3. The analysis is simplified if the phase $\phi$ in Eq. (9) is zero, which reduces Eq. (9) to $$I_C+I_A=2A'_L A'_R \cos (Gt) \sin (Ft). \quad (9A)$$

Note that this result gives the frequency of S, but not its sign. Therefore, more information is needed to determine the direction of rotation. Referring to FIG. 5, the prisms commonly used to combine the counterpropagating beams include a beamsplitter, such as beamsplitter 102, which produces two output spots. The output spots are indicated as A and B on FIG. 5. It can be shown that the intensity pattern one other output can be obtained from the intensity I(y,t) given in Eq. (5) by applying the transformation ky→ky+π. We may then, for example, use signals from this output originating with ky=π/2 and with ky=3π/2. These signals can be electronically subtracted from one another, or one can be electronically or optically delayed by π/G and added to the other to produce a signal $$2A_L A_R[\sin ((G-S)t)-\sin ((G+S)t)]=4A_L A_R \cos Gt \cos St \quad (10)$$

after again high-pass filtering if necessary. It may now be seen that this modulation at the Sagnac frequency S of the carrier at frequency G is in quadrature with the modulation described by Eq. (8), so that the sign and the frequency of S can be read.

Alternately, one of the signals from the second output can be added to the sum of the signals from the uncombined beams, again with its amplitude and delay properly adjusted, to obtain the results shown in Eq. (10).

In practice, the modulation is often examined by stripping off the carrier and looking at the amplitude of the signal. This amplitude detection, however is accompanied through a rectification process that only provides the second harmonic of the modulation frequency. If we take from the second output a pair of signals originating from ky=π/4 and ky=5π/4, the processing described in the previous paragraph leads to:

$$4A_L A_R \cos Gt \cos (St-\pi/4), \quad (11)$$

The second harmonic of the signal of Eq. (11) and of that expressed in Eq. (8) are now in quadrature which permits unambiguous detection of rotation rate and direction.

An alternative to the amplitude detection technique involves using two copies of the signals obtained in Eqs. (8) and (10). One copy of the signal appearing in Eq. (8) is delayed by 90° of phase of the geometric bias, i.e.: by $\pi/2G$, to get $$2A_L A_R[\sin((G-S)t + \sin((G+S)t)], \quad (12)$$

since G is much larger than S. Adding Eq. (12) to Eq.(10) gives $$4A_L A_R \sin((G-S)t). \quad (13)$$

Similarly, delaying the other copy of the signal found in Eq. (10) by $\pi/2G$ and adding it to Eq. (8) gives $$4A_L A_R \cos((G+S)t) \quad (14)$$

Referring to FIG. 1, the signed difference between the frequencies present in these two signals then gives us the direction and the rate of rotation.

The signal 162 output from the photodetector 160 is indicative of the interference pattern formed by combining modes of the same polarization in the combining prism 50. The signal 164 output from the summer 80 is the sum of the signals that indicate the separate intensities of the clockwise and counterclockwise beams in the cavity 34. The signals 162 and 164 may be combined electrically by the summing circuit 92. It is also possible to add the combined beam and separate beam intensity signals optically and then direct the optical sum of these signals to a photodetector. The output of the summing circuit 92 is an electrical signal proportional to (cos (Gt) cos (St)).

Because of the phase difference caused by the space between the photodetectors 120 and 160, the electrical signal output from the photodetector 120 is in quadrature with the electrical signal output from the photodetector 160. The summing circuit 90 adds the output of the summing circuit 80 with the output of the photodetector 120 to produce a signal that is proportional to (cos (Gt) sin (St)).

The signals output from the summing circuits 90 and 92 are demodulated by amplitude demodulators 94 and 96, respectively. G is the carrier frequency. The demodulators 94 and 96 produce signals that are proportional to the cosine and sine of the rotation fringe phase.

The signals output by the photodetectors 72 and 74 may be added to produce Eq. (9), which includes a phase f with respect to the combined beam signals output from the photodetectors 120 and 160. The analysis is simplified by setting the phase $\phi=0$ so that Eq. (9) becomes (2 cos (Gt) cos (Ft)), which may be demodulated by the demodulator 84 to provide information that can be used to control the Faraday bias.

The cavity length dither preferably is at a frequency sufficiently removed from the Faraday bias frequency or from the harmonics of the Faraday bias dither frequency. The cavity length dither modulates the amplitude of Eq. (9) at the dither frequency. The demodulator 82 then demodulates the sum of the separate beam intensities to obtain the component of laser intensity modulation that is synchronous with the cavity length dither, which provides a cavity length control signal.

These delays can be produced electrically by splitting the electrical signals seen in Eqs. (8) and (10) and delaying one copy of each. The prism 50 with its two output spots as shown in FIG. 5, along with two beam splitter cubes 170 and 180 which can be used to generate four output beams. The four outputs beams can be used with four photodiodes to produce the signals described above.

The delays can also be produced optically. One way to do this is to use a second set of fiber optical waveguides in addition to the four guides whose outputs can be added together in pairs to obtain the signals of Eqs. (8) and (10). This extra set of four fiber waveguides can be used to sample portions of the output beams with the same values of ky as the first four, but will be $\pi c/2nG$ longer than the fibers of the first set that carry the same signal. FIG. 6 shows the positions (values of ky) and lengths (value of 1) of the group of fiber waveguides. An embodiment in which four of these fibers carry signals from the uncombined beams is, of course, also possible.

In addition to rotation, the laser cavity length must also be measured. In an instrument with alternating Faraday bias, the magnitude of the Faraday bias must also be measured. Each of the signals suggested for rotation detection so far has a peak amplitude proportional to $A_R A_L$. This amplitude has been used in prior art as the discriminant of a cavity length control servo. This amplitude and any modulation of it used to control the cavity length can be measured on any of the rotation detection signals discussed here, though methods employing 90° phase shifts ($\pi/2G$ delays) to produce signals containing only one of the frequencies G−S or G+S have the advantage that, ideally, their amplitudes are unmodulated by the Sagnac frequency.

The magnitude of the Faraday bias appears as a modulation frequency of the geometric bias on the sum of the intensities of the uncombined clockwise and anti-clockwise beams. The Faraday bias can be measured by performing an amplitude modulation demodulation of this signal indicative of the sum of the uncombined beam intensities. The peak amplitude of the beam intensity sum signal is also proportional to $A_R A_L$. Therefore, modulation of the cavity length is also visible here. Since the Faraday bias frequency and the cavity length modulation frequency are stable and far removed from one another, both can be conveniently determined from this signal.

Some practical considerations are helpful in forming the multioscillator ring laser gyroscope 30 to be a fully operational device. Precise measurements, i.e., counting, at frequencies near the geometric bias G can be difficult. If this is desired, the signals may be heterodyned with a local oscillator (not shown) whose frequency is close to G, but not equal to G, under changing working conditions. Electronics and photodiodes used to operate at hundreds of megahertz are generally complicated and consume considerable amounts of power. Therefore, it is suggested that the geometric bias be kept as low as possible by keeping the laser cavity image rotation as close to $\pm\pi$ or to zero. Also, significant fractions of the optical input power of the laser can be lost in adjusting detectors to detect the appropriate values of ky. Photodiodes, fibers and apertures used should have sizes and shapes designed to provide the required cancellation of unwanted signals while still providing enough power to maximize the signal-to-noise ratio of the desired information.

The plasma dispersion sensitivity does not disappear in the AC biased multioscillator ring laser gyroscope. The dispersion sensitivity of the instrument is close to 0.9/° hr per gauss per megahertz whether the instrument is run with an AC or DC bias. The AC biased multioscillator ring laser gyroscope undergoes the same plasma dispersion equalization process as a DC instrument. The AC bias is monitored and made insensitive to detuning and magnetic fields. The tuning will be nearly the same as the tunings used in DC operation, while the field set point will be close to zero gauss.

The preferred dither drive for the AC biased multioscillator ring laser gyroscope 30 is a 10 Hz square mode. Sinusoidal dither may have advantages in lower dither drive power consumption, but fast square mode turnarounds in the square mode provides better performance.

It has been found that it is necessary to exactly cancel out the bias excursions of each half dither cycle. Consider that the magnetically dithered gyro is the electronic analog of a body dithered gyro that is not glued to its flexure. Any magnetic field applied to the gyro therefore looks like a force that is providing a DC offset to the dither, pushing the gyro around on its flexure. The analogy is somewhat strained in the case of the AC biased multioscillator ring laser gyroscope 30, but controlling the DC offset and temporal symmetry of the dither drive is probably the most critical dither control task. The low Faraday bias of each half dither cycle gives large sinusoids, and it is desirable to cancel these out to within a fraction of a percent. The balancing of performances at low, oppositely signed Faraday biases is also effective at squelching the usual large multioscillator linear temperature sensitivity.

It has also been found that to approach optimum performance with the multioscillator ring laser gyroscope 30, the DC offset level should be controlled to within a half to a tenth of a percent of the AC dither amplitude.

Fitting the kite design of the 325 gyros into a small case presents some physical difficulties, but the simplicity of the processing of the elliptically polarized laser output is quite attractive. One simply separates the right and left circularly polarized beams, one on each side of an upright symmetric prism. Over each polarization's output is placed a typical dual het detector to generate quadrature, i.e., signed, het signals from the "right" and "left" gyros. The signed sum of these het signals then always gives the signed rotation rate, regardless of dither cycle phase, dynamic range exceeding dither depth, etc. The D.C. levels are used for cavity length control. The dither offset control discriminant is provided by the sum of the unsigned het frequencies, or by their difference during periods when rotation rate exceeds dither depth.

The effects of radiation seem to necessitate use of fused silica as the Faraday rotator element 101. With one sixth the Verdet constant of FS-57, obtaining reasonable dither amplitudes seems to require a rotator approximately one-half an inch thick, with the coil 97 being formed in a solenoid style.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

We claim:

1. A ring laser gyroscope including a frame having a cavity therein and a sensing axis about which rotations may be measured using the Sagnac effect, the cavity guiding right circularly polarized clockwise and anticlockwise modes and left circularly polarized clockwise and anticlockwise modes in a closed non-planar optical path that causes a geometrical bias between counterpropagating modes, comprising:

a Faraday rotator in the ray path that provides a Faraday bias for splitting the frequencies of the right circularly polarized clockwise and anticlockwise beams and the left circularly polarized clockwise and anticlockwise beams to provide four different mode frequencies in the cavity;

mode combining apparatus arranged to cause interference between the modes that propagate within the cavity, thereby producing an interference pattern;

apparatus arranged to produce a first combined intensity signal that is indicative of the light intensity in the interference pattern;

apparatus for separating a rotation signal from the first combined intensity signal that includes:

apparatus for producing a second combined intensity signal, the first and second combined intensity signals having a 180° phase difference in corresponding components that are dependent upon the geometric bias; and apparatus for processing the first and second combined intensity signals to produce the rotation signal that is independent of the spatially uniform interference fringes caused by the geometric bias; and signal processing apparatus for processing the rotation signal to measure rotation of the ring laser gyroscope about the sensing axis.

2. The ring laser gyroscope of claim 1 wherein the apparatus for separating a rotation signal from the intensity signal further comprises:

apparatus for producing an intensity sum signal that is indicative of the sum of the beam intensities in the cavity;

delay apparatus arranged to receive the intensity sum signal and produce a delayed intensity sum output signal;

first signal summing apparatus arranged to receive the delayed intensity sum output signal and the first combined intensity signal;

a first demodulator apparatus connected to the first signal summing apparatus and formed to produce an output signal proportional to sin (2St) where S is the rotation rate of the frame about the sensing axis due to the Sagnac effect and t is the time;

second signal summing apparatus arranged to receive the delayed intensity sum output signal and the second combined intensity signal; and a second demodulator apparatus connected to the second signal summing apparatus and formed to produce an output signal proportional to cos (2St) where S is the rotation rate of the frame about the sensing axis due to the Sagnac effect and t is the time.

3. The ring laser gyroscope of claim 1, further including:

a combining prism arranged to receive portions of modes propagating in the cavity, the combining prism including a beam splitter arranged to produce the first and second combined intensity signals on first and second combining prism surfaces, respectively;

a first photodetector arranged to have the first combined intensity signal incident thereon; and a second photodetector arranged to have the second combined intensity signal incident thereon.

4. The ring laser gyroscope of claim 1, further including:

a combining prism arranged to receive portions of modes propagating in the cavity, the combining prism including a beam splitter arranged to produce the first and second combined intensity signals on first and second combining prism surfaces, respectively;

a first pair of optical fibers arranged to receive the first combined intensity signal, one optical fiber being located at $ky=\pi/4$ and the other optical fiber being located at $ky=5\pi/4$ where $k=\omega/c$ and y being the displacement with respect to the center of the first combined intensity signal with ω being the angular frequency and c being the speed of light;

a first photodetector arranged to receive signals output from the first pair of optical fibers one of the first pair of optical fibers being longer than the other by a length ΔL=cπ/nG such that the electrical signal output from the photodetector is proportional to 4 cos (Gt) cos (St);

a second pair of optical fibers arranged to receive the second combined intensity signal, one optical fiber being located at ky=0, and the other optical fiber being located at ky=π0 with respect to the first combined intensity signal; and a second photodetector arranged to receive signals output from the second pair of optical fibers one of the second pair of optical fibers being longer than the other by a length ΔL=cπ/nG such that the electrical signal output from the photodetector is proportional to $$4\cos(Gt)\cos\left(St - \frac{\pi}{4}\right),$$

where n is the refractive index of the optical fibers, G is the geometric bias and S is the rotation rate due to the Sagnac effect.

5. The ring laser gyroscope of claim 1, further including:

a combining prism arranged to receive portions of modes propagating in the cavity and to produce the first combined intensity signal;

a first photodetector placed adjacent the combining prism at a location ky=0 where k=ω/c, y is the displacement with respect to the center of the first combined intensity signal, ω is the angular frequency and c is the speed of light to produce a first photodetector output signal;

a second photodetector placed adjacent the combining prism at a location ky=π with respect to the center of the interference pattern to produce a second photodetector output signal; and a summing circuit connected to the first and second photodetectors to form the sum of the first and second photodetector output signals, the sum being proportional to 4 cos (Gt) cos (St), where G is the geometric bias and S is the rotation rate due to the Sagnac effect.

6. The ring laser gyroscope of claim 1, further including:

a combining prism arranged to receive portions of modes propagating in the cavity and to produce the first combined intensity signal;

a first optical fiber placed adjacent the combining prism at a location ky=0 where k=ω/c, y is the displacement with respect to the center of the first combined intensity signal, ω is the angular frequency and c is the speed of light;

a second optical fiber placed adjacent the combining prism at a location ky=π with respect to the center of the interference pattern; and a photodetector arranged to receive optical signals output from the first and second optical fibers and to produce an electrical signal indicative of the sum of the optical signal intensities incident thereon, the second optical fiber being longer than the first optical fiber by ΔL=cπ/nG such that the electrical signal output from the photodetector is proportional to 4 cos (Gt) cos (St) where n is the refractive index of the first and second optical fibers, G is the geometric bias and S is the rotation rate due to the Sagnac effect.

7. The ring laser gyroscope of claim 1, further including:

a combining prism arranged to receive portions of modes propagating in the cavity and to produce the first combined intensity signal;

apparatus for producing a first optical signal intensity indicative of the intensity of the anticlockwise modes in the cavity and for producing a second optical intensity signal indicative of the intensity of the clockwise modes in the cavity;

a first optical fiber arranged to receive the first optical intensity signal;

a second optical fiber arranged to receive the second optical intensity signal, the first and second optical fibers having identical optical path lengths;

a third optical fiber arranged to receive the first combined intensity signal, which is indicative of interference between modes in the cavity; and a photodetector arranged to receive optical signals from the first, second and third optical fibers, the photodetector producing an electrical signal output proportional to 4 cos (Gt) cos (St) where G is the geometric bias and S is the rotation rate due to the Sagnac effect.

8. The ring laser gyroscope of claim 1, further including:

a combining prism arranged to receive portions of modes propagating in the cavity, the combining prism including a beam splitter arranged to produce the first and second combined intensity signals on first and second combining prism surfaces, respectively;

a first pair of optical fibers arranged to receive the first combined intensity signal, one optical fiber being located at ky=π/2 and the other optical fiber being located at ky=3π/2 where k=ω/c, y is the displacement with respect to the center of the first combined intensity signal, ω is the angular frequency and c is the speed of light;

a first photodetector arranged to receive signals output from the first pair of optical fibers with one of the first pair of optical fibers being longer than the other by a length ΔL=cπ/nG such that the electrical signal output from the photodetector is proportional to 4 cos (Gt) sin (St) where c is the speed of light in vacuum, n is the refractive index of the first pair of optical fibers, G is the geometric bias and S is the rotation rate due to the Sagnac effect;

a second pair of optical fibers arranged to receive the second combined intensity signal, one optical fiber being located at ky=0, and the other optical fiber being located at ky=π with respect to the first combined intensity signal; and a second photodetector arranged to receive signals output from the second pair of optical fibers with one of the second pair of optical fibers being longer than the other by a length ΔL=cπ/nG such that the electrical signal output from the photodetector is proportional to 4 cos (Gt) cos (St).

9. The ring laser gyroscope of claim 1, further including:

a combining prism arranged to receive portions of modes propagating in the cavity, the combining prism including a beam splitter arranged to produce the first and second combined intensity signals on first and second combining prism surfaces, respectively;

a first optical fiber arranged to receive the first combined intensity signal;

a second optical fiber arranged to receive the second combined intensity signal;

apparatus for producing a first optical signal intensity signal indicative of the intensity of the anticlockwise modes in the cavity and for producing a second optical intensity signal indicative of the intensity of the clockwise modes in the cavity;

a third optical fiber arranged to receive the first optical intensity signal;

a fourth optical fiber arranged to receive the second optical intensity signal;

a fifth optical fiber arranged to receive the first optical intensity signal;

a sixth optical fiber arranged to receive the second optical intensity signal;

a first photodetector arranged to receive optical signals from the first, third and sixth optical fibers and produce an electrical signal output proportional to 4 cos (Gt) sin (St); and a second photodetector arranged to receive optical signals from the second, fourth and fifth optical fibers and produce an electrical signal output proportional to 4 cos (Gt) cos (St).

10. The ring laser gyroscope of claim 1, further including:

a combining prism arranged to receive portions of modes propagating in the cavity, the combining prism including a beam splitter arranged to produce the first and second combined intensity signals, respectively;

a first pair of optical fibers arranged to receive the first combined intensity signal;

a second pair of optical fibers arranged to receive the first combined intensity signal;

a first photodetector arranged to receive optical signals output from the first and second pair of optical fibers, the first and second pair of optical fibers having locations in the interference pattern that forms the combined intensity signal such that the first photodetector adds the optical signals incident thereon and produces an electrical signal output proportional to sin (G+S)t, where G is the geometric bias and S is the rotation rate due to the Sagnac effect;

a third pair of optical fibers arranged to receive the second combined intensity signal;

a fourth pair of optical fibers arranged to receive the second combined intensity signal; and a second photodetector arranged to receive optical signals output from the third and fourth pair of optical fibers, the third and fourth pair of optical fibers having locations in the interference pattern that forms the combined intensity signal such that the second photodetector adds the optical signals incident thereon and produces an electrical signal output proportional to cos (G−S)t.

11. The ring laser gyroscope of claim 1 wherein the Faraday rotator includes:

a magneto-optically active material placed in the cavity in the optical path;

an electrically conductive coil formed around the magneto-optically active material; and a source of alternating electrical power connected to the coil to form an axially directed time-varying magnetic field on the magneto-optically active material to form an alternating Faraday bias thereon.

12. A ring laser gyroscope that guides right circularly polarized clockwise and anticlockwise modes and left circularly polarized clockwise and anticlockwise beams in a closed non-planar ray path in a cavity that causes a geometrical bias between counterpropagating modes, comprising:

a Faraday rotator element in the ray path for splitting the frequencies of the right circularly polarized clockwise and anticlockwise beams and the left circularly polarized clockwise and anticlockwise beams to provide a total of four different mode frequencies in the cavity;

a beamsplitter arranged to receive portions of the four modes that propagate in the ray path;

a pair of combining prisms arranged to cause the modes of like polarization and opposite direction of propagation in the ray path to interfere and produce a first interference signal and a second interference signal;

filtering apparatus in the optical paths of the first and second interference signals to pass only optical signals having frequencies near the geometrical bias frequency;

photodetector apparatus for detecting the filtered signals to produce first and second electrical signals; and time delay apparatus for producing a time delay in one of the filtered signals before it is incident upon the photodetector apparatus, the time delay being selected such that components in the filtered signals that are dependent upon the geometrical bias are 180° out of phase.

13. A ring laser gyroscope that guides right circularly polarized clockwise and anticlockwise modes and left circularly polarized clockwise and anticlockwise beams in a closed non-planar ray path in a cavity formed in a frame that causes a geometrical bias between counterpropagating modes, comprising:

a Faraday rotator element in the ray path for splitting the frequencies of the right circularly polarized clockwise and anticlockwise beams and the left circularly polarized clockwise and anticlockwise beams to provide a total of four different mode frequencies in the cavity;

mode combining apparatus arranged to cause the modes of like polarization and opposite direction of propagation in the ray path to interfere and produce a first interference signal and a second interference signal;

filtering apparatus in the optical paths of the first and second interference signals to pass only optical signals having frequencies near the geometrical bias frequency;

photodetector apparatus for detecting the filtered signals to produce first and second electrical signals; and signal processing circuitry for subtracting the first electrical signal from the second electrical signal to eliminate dependence upon the geometrical bias.

14. The ring laser gyroscope of claim 13, further comprising apparatus for processing the first and second interference signals to produce a signal that is indicative of rotation of the frame about the sensing axis and that is independent of the spatially uniform interference fringes caused by the geometric bias.

15. The ring laser gyroscope of claim 14, further comprising:

apparatus for producing an intensity sum signal that is indicative of the sum of the beam intensities in the cavity;

delay apparatus arranged to receive the intensity sum signal and produce a delayed intensity sum output signal;

mode combining apparatus arranged to cause interference between the modes that propagate within the cavity, thereby producing an interference pattern;

apparatus arranged to produce a first combined intensity signal that is indicative of the light intensity in the interference pattern;

apparatus for producing a second combined intensity signal, the first and second combined intensity signals having a 180° phase difference in corresponding components that are dependent upon the geometric bias;

first signal summing apparatus arranged to receive the delayed intensity sum output signal and the first combined intensity signal;

a first demodulator apparatus connected to the first signal summing apparatus and formed to produce an output signal proportional to sin (2St) where S is the rotation rate of the frame about the sensing axis due to the Sagnac effect and t is the time;

second signal summing apparatus arranged to receive the delayed intensity sum output signal and the second combined intensity signal; and a second demodulator apparatus connected to the second signal summing apparatus and formed to produce an output signal proportional to cos (2St) where S is the rotation rate of the frame about the sensing axis due to the Sagnac effect and t is the time.

16. A method for measuring rotations with a ring laser gyroscope including a frame having a cavity therein and a sensing axis about which rotations may be measured using the Sagnac effect, the cavity guiding right circularly polarized clockwise and anticlockwise modes and left circularly polarized clockwise and anticlockwise modes in a closed non-planar optical path that causes a geometrical bias between counterpropagating modes, comprising the steps of:

placing a Faraday rotator in the optical path for providing a Faraday bias that splits the frequencies of the right circularly polarized clockwise and anticlockwise beams and the left circularly polarized clockwise and anticlockwise beams to provide a four different mode frequencies in the cavity;

arranging mode combining apparatus to produce an interference pattern indicative of interference between the modes that propagate within the cavity;

producing a first combined intensity signal that is indicative of the light intensity in the interference pattern caused by the effect of the mode combining apparatus on the modes;

separating a rotation signal from the first combined intensity signal by a process that includes the steps of:

producing a second combined intensity signal, the first and second combined intensity signals having a 180° phase difference in corresponding components that are dependent upon the geometric bias; and processing the first and second combined intensity signals to produce the rotation signal that is independent of the spatially uniform interference fringes caused by the geometric bias; and processing the rotation signal to measure rotation of the ring laser gyroscope about the sensing axis.

17. The ring laser gyroscope of claim 16 wherein the step of separating a rotation signal from the combined intensity signal further comprises the steps of:

producing an intensity sum signal that is indicative of the sum of the uncombined separate beam intensities in the cavity;

producing a delayed intensity sum output signal;

summing the delayed intensity sum output signal and the first combined intensity signal;

demodulating signals output from the first signal summing apparatus;

producing an output signal proportional to sin (2St) where S is the rotation rate of the frame about the sensing axis due to the Sagnac effect and t is the time;

summing the delayed intensity sum output signal and the second combined intensity signal;

demodulating signals output from the second signal summing apparatus; and producing an output signal proportional to cos (2St) where S is the rotation rate of the frame about the sensing axis due to the Sagnac effect and t is the time.

18. The method of claim 16, further including the steps of:

arranging a combining prism to receive portions of modes propagating in the cavity;

producing the first and second combined intensity signals on first and second combining prism surfaces, respectively;

arranging a first photodetector to have the first combined intensity signal incident thereon; and arranging a second photodetector to have the first combined intensity signal incident thereon.

19. The method of claim 16, further including the steps of:

arranging a combining prism to receive portions of modes propagating in the cavity;

producing the first and second combined intensity signals on first and second combining prism surfaces, respectively;

arranging a first pair of optical fibers to receive the first combined intensity signal by the steps of locating one optical fiber (270) at $ky=\pi/4$ and locating the other optical fiber at $ky=5\pi/4$ where $k=\omega/c$, y is the displacement with respect to the center of the first combined intensity signal, $\omega$ is the angular frequency and c is the speed of light;

arranging a first photodetector to receive signals output from the first pair of optical fibers with one of the first pair of optical fibers being longer than the other by a length $\Delta L=c\pi/nG$ such that the electrical signal output from the photodetector is proportional to 4 cos (Gt) cos (St);

arranging a second pair of optical fibers to receive the second combined intensity signal, one optical fiber being located at $ky=0$, and the other optical fiber being located at $ky=\pi$ with respect to the first combined intensity signal;

arranging a second photodetector to receive signals output from the second pair of optical fibers with one of the second pair of optical fibers being longer than the other by a length $\Delta L=c\pi/nG$ such that the electrical signal output from the photodetector is proportional to $$4\cos(Gt)\cos\left(St-\frac{\pi}{4}\right),$$

where n is the refractive index of the optical fibers, G is the geometric bias and S is the rotation rate due to the Sagnac effect.

20. The method of claim 16, further including the steps of:

arranging a combining prism to receive portions of modes propagating in the cavity and to produce the first combined intensity signal;

placing a first photodetector adjacent the combining prism at a location $ky=0$ where $k=\omega/c$, y is the displacement with respect to the center of the first combined intensity signal, o is the angular frequency and c is the speed of light;

placing a second photodetector adjacent the combining prism at a location ky=π with respect to the center of the interference pattern to produce a second photodetector output signal; and connecting a summing circuit to the first and second photodetectors to form the sum of the first and second photodetector output signals, the sum being proportional to 4 cos (Gt) cos (St), where G is the geometric bias and S is the rotation rate due to the Sagnac effect.

21. The method of claim 16, further including the steps of:

arranging a combining prism to receive portions of modes propagating in the cavity and to produce the first combined intensity signal;

placing a first optical fiber adjacent the combining prism at a location ky=0 where k=ω/c, y is the displacement with respect to the center of the first combined intensity signal, ω is the angular frequency and c is the speed of light;

placing a second optical fiber adjacent the combining prism at a location ky=π with respect to the center of the interference pattern;

arranging a photodetector to receive optical signals output from the first and second optical fibers and to produce an electrical signal indicative of the sum of the optical signal intensities incident thereon, the second optical fiber being longer than the first optical fiber by $\Delta L = c\pi/nG$ such that the electrical signal output from the photodetector (242) is proportional to 4 cos (Gt) cos (St) where c is the speed of light in vacuum, n is the refractive index of the first and second optical fibers G is the geometric bias and S is the rotation rate due to the Sagnac effect.

22. The method of claim 16, further including the steps of:

arranging a combining prism to receive portions of modes propagating in the cavity and to produce the first combined intensity signal;

producing a first optical signal intensity signal indicative of the intensity of the anticlockwise modes in the cavity and for producing a second optical intensity signal indicative of the intensity of the clockwise modes in the cavity;

arranging a first optical fiber to receive the first optical intensity signal;

arranging a second optical fiber to receive the second optical intensity signal;

forming the first and second optical fibers to have identical optical path lengths;

arranging a third optical fiber (260) to receive the first combined intensity signal, which is indicative of interference between modes in the cavity; and arranging a photodetector to receive optical signals from the first, second and third optical fibers, the photodetector producing an electrical signal output proportional to 4 cos (Gt) cos (St) where G is the geometric bias and S is the rotation rate due to the Sagnac effect.

23. The method of claim 16, further including the steps of:

arranging a combining prism to receive portions of modes propagating in the cavity, the combining prism including a beam splitter arranged to produce the first and second combined intensity signals on first and second combining prism surfaces, respectively;

arranging a first pair of optical fibers to receive the first combined intensity signal, one optical fiber being located at ky=π/2 and the other optical fiber being located at ky=3π/2 where k=ω/c, y is the displacement with respect to the center of the first combined intensity signal, ω is the angular frequency and c is the speed of light;

arranging a first photodetector to receive signals output from the first pair of optical fibers one of the first pair of optical fibers being longer than the other by a length $\Delta L = c\pi/nG$ such that the electrical signal output from the photodetector is proportional to 4 cos (Gt) sin (St) where c is the speed of light in vacuum, n is the refractive index of the first pair of optical fibers, G is the geometric bias and S is the rotation rate due to the Sagnac effect;

arranging a second pair of optical fibers to receive the second combined intensity signal, one optical fiber being located at ky=0, and the other optical fiber being located at ky=π with respect to the first combined intensity signal; and arranging a second photodetector to receive signals output from the second pair of optical fibers one of the second pair of optical fibers being longer than the other by a length $\Delta L = c\pi/nG$ such that the electrical signal output from the photodetector is proportional to 4 cos (Gt) cos (St).

24. The method of claim 17, further including the steps of:

arranging a combining prism to receive portions of modes propagating in the cavity;

producing the first and second combined intensity signals on first and second combining prism surfaces, respectively;

arranging a first optical fiber to receive the first combined intensity signal;

arranging a second optical fiber to receive the second combined intensity signal;

producing a first optical signal intensity signal indicative of the intensity of the anticlockwise modes in the cavity and for producing a second optical intensity signal indicative of the intensity of the clockwise modes in the cavity;

arranging a third optical fiber to receive the first optical intensity signal;

arranging a fourth optical fiber to receive the second optical intensity signal;

arranging a fifth optical fiber to receive the first optical intensity signal;

arranging a sixth optical fiber to receive the second optical intensity signal;

receiving optical signals from the first, third and sixth optical fibers with a first photodetector and producing an electrical signal output proportional to 4 cos (Gt) sin (St); and receiving optical signals from the second, fourth and fifth optical fibers a second photodetector and producing an electrical signal output proportional to 4 cos (Gt) cos (St).

25. The method of claim 17, further including:

receiving portions of modes propagating in the cavity with a combining prism;

producing the first and second combined intensity signals;

arranging a first pair of optical fibers to receive the first combined intensity signal, arranging a second pair of optical fibers to receive the first combined intensity signal, receiving optical signals output from the first and second pair of optical fibers with a first photodetector;

locating the first and second pair of optical fibers in the interference pattern that forms the combined intensity signal such that the first photodetector adds the optical signals incident thereon and produces an electrical signal output proportional to sin (G+S)t, where G is the geometric bias and S is the rotation rate due to the Sagnac effect;

arranging a third pair of optical fibers to receive the second combined intensity signal, arranging a fourth pair of optical fibers to receive the second combined intensity signal, receiving optical signals output from the third and fourth pair of optical fibers with a second photodetector; and locating the third and fourth pair of optical fibers in the interference pattern that forms the combined intensity signal such that the second photodetector adds the optical signals incident thereon and produces an electrical signal output proportional to cos (G−S)t.

26. The method of claim 17 wherein the Faraday rotator includes:

placing a magneto-optically active material in the cavity in the optical path;

forming an electrically conductive coil around the magneto-optically active material; and connecting a source of alternating electrical power to the coil to form an axially directed time-varying magnetic field on the magneto-optically active material to form an alternating Faraday bias thereon.

27. A method for measuring rotations with a ring laser gyroscope including a frame having a cavity therein and a sensing axis about which rotations may be measured using the Sagnac effect, the cavity guiding right circularly polarized clockwise and anticlockwise modes and left circularly polarized clockwise and anticlockwise modes in a closed non-planar optical path that causes a geometrical bias between counterpropagating modes, comprising the steps of:

splitting the frequencies of the right circularly polarized clockwise and anticlockwise beams and the left circularly polarized clockwise and anticlockwise beams to provide a total of four different mode frequencies in the cavity;

producing a first interference signal and a second interference signal by combining modes;

filtering the first and second interference signals to pass only optical signals having frequencies near the geometrical bias frequency;

producing first and second electrical signals with a photodetector that are indicative of the first and second interference signals;

producing a time delay in one of the filtered signals before it is incident upon the photodetector apparatus, the time delay being selected such that components in the filtered signals that are dependent upon the geometrical bias are 180° out of phase.

28. A method for measuring rotations with a ring laser gyroscope including a frame having a cavity therein and a sensing axis about which rotations may be measured using the Sagnac effect, the cavity guiding right circularly polarized clockwise and anticlockwise modes and left circularly polarized clockwise and anticlockwise modes in a closed non-planar optical path that causes a geometrical bias between counterpropagating modes, comprising the steps of:

splitting the frequencies of the right circularly polarized clockwise and anticlockwise beams and the left circularly polarized clockwise and anticlockwise beams with a Faraday bias to provide a total of four different mode frequencies in the cavity;

combining modes to produce a first interference signal and a second interference signal;

filtering the first and second interference signals to pass only optical signals having frequencies near the geometrical bias frequency;

detecting the first and second interference signals with photodetector apparatus to produce first and second electrical signals;

subtracting the first electrical signal from the second electrical signal to eliminate dependence upon the geometrical bias.

29. The method of claim 28, further comprising the step of processing the first and second interference signals to produce a signal that is indicative of rotation of the frame about the sensing axis and that is independent of the spatially uniform interference fringes caused by the geometric bias.

30. The method of claim 29, further comprising the steps of:

producing an intensity sum signal that is indicative of the sum of the beam intensities in the cavity;

producing a delayed intensity sum output signal;

producing an interference pattern between the modes that propagate within the cavity, thereby;

producing a first combined intensity signal that is indicative of the light intensity in the interference pattern;

producing a second combined intensity signal, the first and second combined intensity signals having a 180° phase difference in corresponding components that are dependent upon the geometric bias;

summing the delayed intensity sum output signal and the first combined intensity signal;

demodulating the sum of the delayed intensity sum output signal and the first combined intensity signal;

producing an output signal proportional to sin (2St) where S is the rotation rate of the frame about the sensing axis due to the Sagnac effect and t is the time;

summing the delayed intensity sum output signal and the second combined intensity signal;

demodulating the sum of the delayed intensity sum output signal and the second combined intensity signal and producing an output signal proportional to cos (2St) where S is the rotation rate of the frame about the sensing axis due to the Sagnac effect and t is the time.

* * * * *